United States Patent
Lee et al.

(10) Patent No.: US 10,548,115 B2
(45) Date of Patent: Jan. 28, 2020

(54) METHOD FOR TRANSMITTING AND RECEIVING SIGNALS ON BASIS OF NON-ORTHOGONAL MULTIPLE ACCESS SCHEME, AND APPARATUS THEREFOR

(71) Applicant: LG ELECTRONICS INC., Seoul (KR)

(72) Inventors: Hojae Lee, Seoul (KR); Sangrim Lee, Seoul (KR); Hyunsoo Ko, Seoul (KR); Kwangseok Noh, Seoul (KR); Dongkyu Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/756,017

(22) PCT Filed: Jul. 27, 2016

(86) PCT No.: PCT/KR2016/008203
§ 371 (c)(1),
(2) Date: Feb. 27, 2018

(87) PCT Pub. No.: WO2017/057834
PCT Pub. Date: Apr. 6, 2017

(65) Prior Publication Data
US 2018/0249452 A1    Aug. 30, 2018

Related U.S. Application Data

(60) Provisional application No. 62/235,497, filed on Sep. 30, 2015.

(51) Int. Cl.
*H04W 72/04* (2009.01)
*H04L 25/03* (2006.01)
(Continued)

(52) U.S. Cl.
CPC ..... *H04W 72/0406* (2013.01); *H04J 11/0046* (2013.01); *H04L 5/0021* (2013.01);
(Continued)

(58) Field of Classification Search
None
See application file for complete search history.

(56) References Cited

U.S. PATENT DOCUMENTS

2015/0043540 A1    2/2015  Nikopour et al.
2015/0280744 A1*  10/2015  Kim ............... H04L 1/1607
                                                          714/776
(Continued)

FOREIGN PATENT DOCUMENTS

| KR | 1020140125643 | 10/2014 |
|---|---|---|
| KR | 1020150070973 | 6/2015 |
| WO | 2015065113 | 5/2015 |

OTHER PUBLICATIONS

PCT International Application No. PCT/KR2016/008203, Written Opinion of the International Searching Authority dated Oct. 27, 2016, 23 pages.
(Continued)

*Primary Examiner* — Hassan A Phillips
*Assistant Examiner* — Gautam Sharma
(74) *Attorney, Agent, or Firm* — Lee Hong Degerman Kang & Waimey

(57) ABSTRACT

A method for a terminal to transmit signals on the basis of a non-orthogonal multiple access scheme in a wireless communication system may comprise the steps of: receiving, from a base station, information about a codebook selected for the terminal in pre-defined non-orthogonal codebooks and control information including information about a codeword selected from the selected codebook; performing resource mapping on uplink data to be transmit-
(Continued)

ted on the basis of information about the selected codebook and information about the codeword selected from the selected codebook; transmitting, to the base station, the uplink data mapped to the resource according to the resource mapping.

15 Claims, 5 Drawing Sheets

(51) Int. Cl.
    *H04L 27/26*     (2006.01)
    *H04L 5/00*     (2006.01)
    *H04J 11/00*     (2006.01)
    *H04W 72/12*     (2009.01)
    *H04L 25/02*     (2006.01)

(52) U.S. Cl.
    CPC ........ *H04L 25/03* (2013.01); *H04L 25/03331* (2013.01); *H04L 27/26* (2013.01); *H04L 27/2634* (2013.01); *H04W 72/12* (2013.01); *H04L 25/0224* (2013.01)

(56) References Cited

U.S. PATENT DOCUMENTS

| | | | | |
|---|---|---|---|---|
| 2015/0282185 | A1* | 10/2015 | Nikopour | H04L 1/0002 370/329 |
| 2015/0341093 | A1* | 11/2015 | Ji | H04B 1/707 375/267 |
| 2015/0341100 | A1* | 11/2015 | Kwak | H04B 7/0626 370/329 |
| 2016/0049999 | A1* | 2/2016 | Taherzadeh Boroujeni | H04J 13/16 370/335 |
| 2016/0050039 | A1* | 2/2016 | Ma | H04L 5/0016 370/329 |
| 2016/0374060 | A1* | 12/2016 | Lim | H04L 5/0048 |
| 2017/0047975 | A1* | 2/2017 | Lee | H04B 7/0486 |
| 2018/0014320 | A1* | 1/2018 | Xu | H04W 72/04 |
| 2018/0083683 | A1* | 3/2018 | Kim | H04B 7/0626 |
| 2018/0109347 | A1* | 4/2018 | Cai | H04J 13/0025 |
| 2018/0294997 | A1* | 10/2018 | Lee | H04B 7/0452 |

OTHER PUBLICATIONS

5GNOW, "Final 5GNOW Transceiver and frame structure concept", D3.3, Version 1.0, Retrieved from the web, May 2015, 95 pages.

* cited by examiner

METHOD FOR TRANSMITTING AND RECEIVING SIGNALS ON BASIS OF NON-ORTHOGONAL MULTIPLE ACCESS SCHEME, AND APPARATUS THEREFOR

CROSS-REFERENCE TO RELATED APPLICATIONS

This application is the National Stage filing under 35 U.S.C. 371 of International Application No. PCT/KR2016/008203, filed on Jul. 27, 2016, which claims the benefit of U.S. Provisional Application No. 62/235,497, filed on Sep. 30, 2015, the contents of which are all hereby incorporated by reference herein in its entirety.

TECHNICAL FIELD

The present invention relates to wireless communication, and more particularly, to a method for transmitting and receiving signals on the basis of a non-orthogonal multiple access scheme and an apparatus therefor.

BACKGROUND ART

A 3GPP LTE (3rd Generation Partnership Project Long Term Evolution) system has been designed in a frame structure having a transmission time interval (TTI) of 1 ms, and its data request latency time for a video application is 10 ms. However, the future 5G technology requires data transmission of lower latency due to the advent of a new application such as real-time control and tactile internet, and it is expected that 5G data request latency will be lowered to reach 1 ms. Also, the future 5G technology requires more massive UE connectivity for one base station, and it is expected that 5G requirement connectivity will be increased to maximum 1,000,000/km2.

DISCLOSURE

Technical Problem

An object of the present invention is to provide a method for transmitting signals from a user equipment (UE) on the basis of a non-orthogonal multiple access scheme in a wireless communication system.

Another object of the present invention is to provide a method for receiving signals in a base station (BS) on the basis of a non-orthogonal multiple access scheme in a wireless communication system.

Still another object of the present invention is to provide a method for receiving signals in a base station (BS) on the basis of a non-orthogonal multiple access scheme in a wireless communication system.

Further still another object of the present invention is to provide a base station (BS) for receiving signals on the basis of a non-orthogonal multiple access scheme in a wireless communication system.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve one object of the present invention, a method for transmitting, by a user equipment (UE), a signal based on a non-orthogonal multiple access scheme in a wireless communication system may comprise the steps of receiving, from a base station, control information including information on a codebook selected for the UE from predefined non-orthogonal codebooks and information on a codeword selected from the selected codebook; performing resource mapping for uplink data to be transmitted based on the information on the selected codebook and the information on the codeword selected from the selected codebook; and transmitting, to the base station, the uplink data mapped into a corresponding resource according to the resource mapping. The information on the selected codebook may include a selected codebook index. The information on the selected codeword may include selected codeword index information. The information on the selected codeword may further include information indicating a codeword assignment scheme according to a selected multi-user detection scheme. The selected codebook may be determined based on the selected multi-user detection scheme. The information on the selected codebook and the information on the codeword selected from the selected codebook may be selected UE-specifically.

To achieve another object of the present invention, a method for receiving, by a base station (BS), a signal based on a non-orthogonal multiple access scheme in a wireless communication system may comprise selecting a multi-user detection (MUD) scheme; selecting a codebook for the UE from predefined non-orthogonal codebooks and a codeword from the selected codebook on the basis of the selected multi-user detection scheme; and transmitting, to the UE, control information including information on the selected codebook and information on the selected codeword.

The method may further comprise receiving uplink data according to scheduling of the control information from the UE; and detecting the uplink data of the UE on the basis of the information on the selected codebook, the information on the selected codeword and the selected multi-user detection scheme.

The multi-user detection scheme may be selected based on a result of channel estimation for the UE and a scheduling scheme. The method may further comprise performing channel estimation for the UE; and performing scheduling for multi-UE in accordance with the scheduling scheme.

To achieve still another object of the present invention, a user equipment (UE) for transmitting a signal based on a non-orthogonal multiple access scheme in a wireless communication system may comprise a receiver configured to receive, from a base station (BS), control information including information on a codebook selected for the UE from predefined non-orthogonal codebooks and information on a codeword selected from the selected codebook; a processor configured to perform resource mapping for uplink data to be transmitted based on the information on the selected codebook and the information on the codeword selected from the selected codebook; and a transmitter configured to transmit, to a base station (BS), the uplink data mapped into a corresponding resource according to the resource mapping. The information on the selected codebook and the information on the codeword selected from the selected codebook may be selected UE-specifically.

To achieve further still another object of the present invention, a base station (BS) for receiving a signal based on a non-orthogonal multiple access scheme in a wireless communication system may comprise a processor configured to select a multi-user detection (MUD) scheme and select a codebook for the UE from predefined non-orthogonal codebooks and a codeword from the selected codebook based on the selected multi-user detection scheme; and a transmitter configured to transmit, to the UE, control information including information on the selected codebook and information on the selected codeword. The BS may further comprise a receiver configured to receive uplink data according to scheduling of the control information from the UE, wherein the processor may be configured to detect the uplink data of the UE based on the information on the selected codebook, the information on the selected codeword and the selected multi-user detection scheme. The processor may be configured to select the multi-user detection scheme based on a result of channel estimation for the UE and a scheduling scheme. The processor may be configured to perform channel estimation for the UE and perform scheduling for multi-UE in accordance with the scheduling scheme.

Advantageous Effects

In accordance with one embodiment of the present invention, multi-UE interference variation according to multi-UE channel variation of a non-orthogonal coded multiple access (NCMA) system may be avoided and uniform interference may be maintained, whereby MUD performance of a receiving side may be enhanced.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention. In the drawings.

BEST MODE FOR CARRYING OUT THE INVENTION

Figure 1:
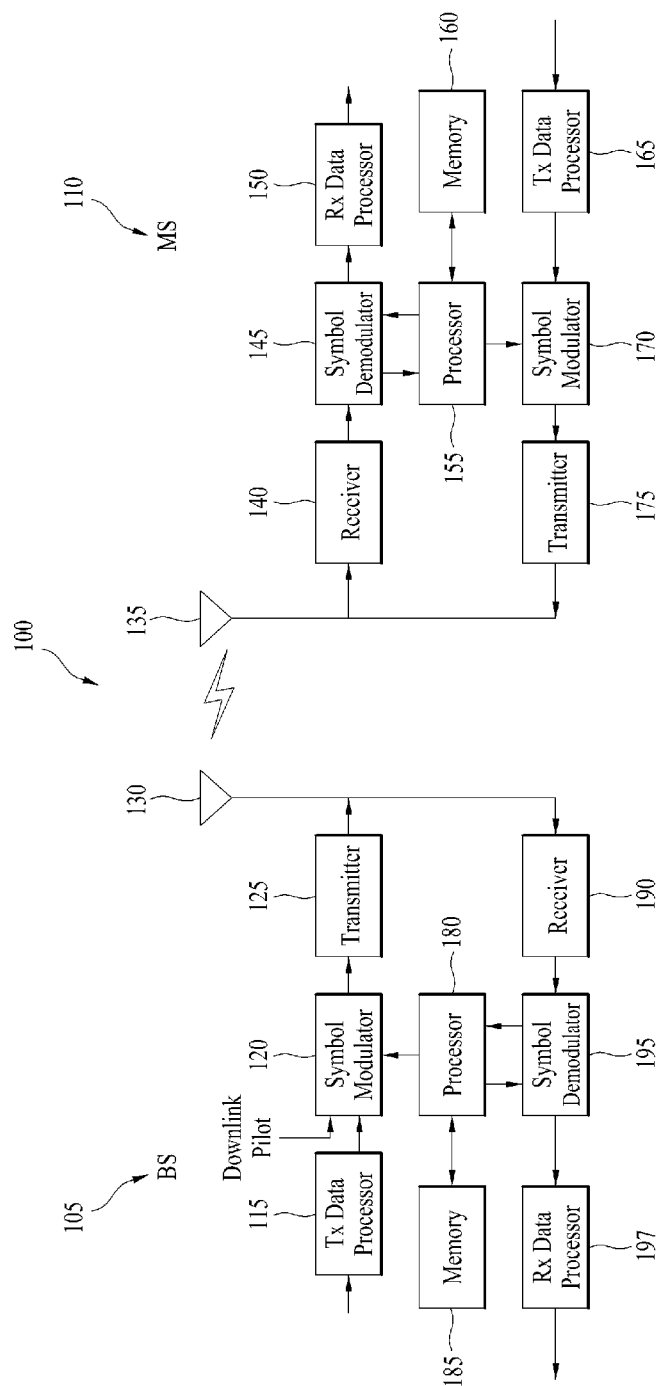
FIG. 1 is a block diagram illustrating a configuration of a base station 105 and a user equipment 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

For wireless transmission between a BS and a UE, transmission from a BS to a UE is expressed as downlink transmission, and transmission from a UE to a BS is expressed as uplink transmission. A mode for identifying radio resources between downlink transmission and uplink transmission will be defined as a duplex mode, and bidirectional transmission and reception through division of a frequency band into a downlink transmission band and an uplink transmission band will be expressed as a frequency division duplex (FDD) mode. It will be apparent that the technology suggested in the present invention may be operated in time division duplex (TDD) for bidirectional transmission and reception through division of a time resources into a downlink transmission time and an uplink transmission time and full duplex for bidirectional transmission and reception through sharing of time and frequency resources as well as the FDD.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

The present invention suggests a method for controlling uplink multi-UE interference of a Non-orthogonal Coded Multiple Access (NCMA) system among systems for superposition transmission of signals for multiple users to the same time-frequency resource.

A Non-orthogonal Multiple Access system is one of schemes for superposition transmission of multi-UE data to the same time-frequency resource, and may be categorized into NOMA system. The NOMA system may be referred to as Multiuser Superposition Transmission (MUST) in the 3GPP standardization task. The NOMA system is considered as the element technology of the next generation 5G system intended to obtain transmission capacity gain or increase the number of simultaneous accesses as compared with the LTE system by transmitting information for a plurality of UEs to the same time-frequency resource through superposition. Examples of the NOMA based technology of the next generation 5G system include MUST for identifying UEs based on a power level, Sparse Code Multiple Access (SCMA) that uses sparse complex codebook based modulation, and interleave division multiple access (IDMA) that uses a user-specific interleaver.

In case of the NOMA system, the transmitting end varies power allocation of each symbol after modulation of multi-UE data or transmits the multi-UE data by hierarchically modulating the multi-UE data based on hierarchical modulation and applying sparsity to the frequency resource, and the receiver demodulates the multi-UE data through multiuser detection (MUD).

Each system may demodulate the multi-UE data in various MUD schemes. Examples of the various MUD schemes include Maximum Likelihood (ML), Maximum joint A posteriori Probability (MAP), Message Passing Algorithm (MPA), Matched Filtering (MF), Successive Interference Cancellation (SIC), Parallel Interference Cancellation (PIC), and Codeword Interference Cancellation (CWIC). There may be a difference in demodulation complexity and processing time delay in accordance with each demodulation scheme or the number of repeated demodulation attempts. Since the NOMA based systems transmit multiuser signals to the same time-frequency resource through superposition, the systems have a higher decoding error rate as compared with the LTE system but may support higher frequency usage efficiency or more massive connectivity. The NOMA systems may support higher frequency usage efficiency or more massive connectivity. The NOMA systems may achieve higher frequency usage efficiency or more massive connectivity while maintaining a decoding error through coding rate control in accordance with a system environment.

Figure 2:
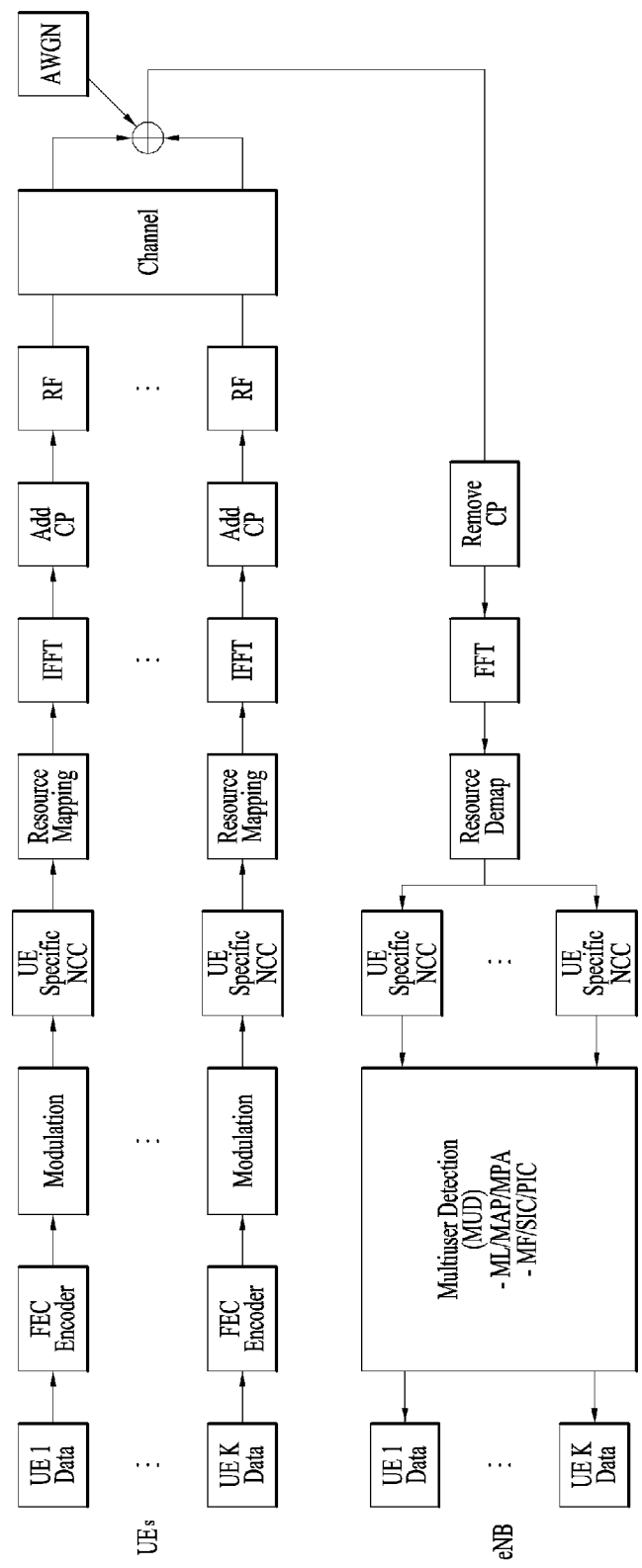
FIG. 2 is an exemplary block diagram illustrating NCMA based uplink transmission/reception (Tx/Rx) of a communication apparatus.

FIG. 2 is an exemplary block diagram illustrating NCMA based uplink transmission/reception (Tx/Rx) of a communication apparatus.

The NCMA system quantifies multiuser interference by applying a code that minimizes multi-UE interference to a frequency resource. FIG. 2 illustrates uplink transmitting end/receiving end (or transmitting side/receiving side) structures of the NCMA system that performs superposition transmission by using UE specific non-orthogonal code cover (NCC) when multi-UE information is allocated to the same time-frequency resource. The transmitting end/receiving end allocates UE-specific NCC to each UE by using a non-orthogonal codebook which is previously defined.

The codeword mentioned in the present invention means a complex element vector selected by (or allocated to) each UE to perform non-orthogonal multiple access. The codebook means a set of codewords used by each UE to perform non-orthogonal multiple access. The codebook mentioned as above may exist as a plurality of codebooks. The UE-specific NCC means that the complex element vector of the codebook selected by (or allocated to) each UE is used for a symbol to be transmitted. Therefore, the NCC (or UE-specific NCC) may be expressed as codebook index and codeword index. The non-orthogonal codebook is expressed as illustrated in the following Equation 1.

$$C = [c^{(1)} \ \ldots \ c^{(K)}] = \begin{bmatrix} c_1^{(1)} & \ldots & c_1^{(K)} \\ \vdots & \ddots & \vdots \\ c_N^{(1)} & \ldots & c_N^{(K)} \end{bmatrix} \quad \text{[Equation 1]}$$

In the above Equation 1, $c^{(j)}$ is a codeword for the jth UE, and a codeword set for a total of K UEs becomes a codebook C. Use of $c^{(j)}$ for data transmission of the jth UE is defined as NCC. Also, the codebook may be expressed as a vector length N of the codeword and the number K of codewords. In this case, N means a spreading factor, and K means a superposition factor. For convenience of description, although one codeword is used for one UE, a plurality of codewords may be used by one UE or one codeword may be used by a plurality of UEs. Also, one or more codewords allocated to one UE may be subjected to hopping of codewords by use of different codewords in the same codebook or use of different codewords in different codebooks in accordance with time or usage frequency.

UE-specific NCC may be allocated by connection with UE ID in RRC connection process, or may be allocated through DCI (downlink control information) format included in a downlink control channel (for example, PDCCH).

In case of an uplink environment used for contention based multiple access (MA), a UE may select non-orthogonal codewords randomly or through connection with UE ID. At this time, UE-specific NCC is not allocated by a base station but directly selected by a UE, whereby NCC contention between multiple UEs may occur. A success rate for identification of multi-UE information is reduced due to MUD if there is contention of NCC in the base station which is a receiver.

The UE-specific NCC may be defined by Grassmannian line packing, and a chordal distance formed by two random vectors in the same subspace is always maintained equally. That is, the chordal distance may be obtained mathematically or algorithmically as a codebook that satisfies $\min_C (\max_{1 \leq k \leq j \leq K} \sqrt{1 - |c^{(k)*} \cdot c^{(j)}|^2})$, $C \subset \mathbb{C}^{N \times K}$. The UE-specific NCC has features as expressed by the following Equation 2.

$$\begin{cases} |c^{(k)^*} \cdot c^{(k)}| = 1, \forall k, k = 1, \ldots, K \\ \text{if } N > K, |c^{(k)^*} \cdot c^{(j)}| = \delta, \forall k, \forall j, k = 1, \ldots, K, j = 1, \ldots, K, \\ \text{if } N \leq K, |c^{(k)^*} \cdot c^{(j)}| = 0, \forall k, \forall j, k = 1, \ldots, K, j = 1, \ldots, K. \end{cases}$$ [Equation 2]

In this case, $c^{(k)*}$ is a conjugate codeword of $c^{(k)}$. The features of the Equation 2 are as listed in the followings (1), (2), and (3).

(1) Multiplication of the same codewords in the transmitting end and receiving end is 1.

(2) The chordal distance between a codeword and another codeword in the same codebook is equally maintained.

(3) If N≤K, a codeword is orthogonal to another codeword.

The codebook having the above features is previously scheduled by the transmitting end/receiving end (or transmitting side/receiving side) to configure UE-specific NCC. In this case, a lower bound of a chordal distance $$\delta_{N,K} \geq \sqrt{1 - \frac{(N-1)K}{N(K-1)}}.$$

according to two random codewords is obtained. Therefore, MUI for superposition transmission of multi-UE data is determined by being minimized by the lower bound. Also, since the chordal distance for the two random codewords is always maintained equally, statistical prediction of MUI may be performed by the number of UEs. If the number of UEs is determined, since a decoding error rate of the receiver may be predicted by MUI value, MCS level may be controlled based on interference for multi-UE superimposition transmission. For example, when K codewords are transmitted in (N×1) dimension, if the receiver performs decoding using its codewords, 1 is decoded from its codeword, and statistical interference of $\delta_{N,K}(K-1)$ remains from another K−1 codewords. This value is varied depending on an optimization level of a codebook design. Also, since a difference in a value of $\delta_{N,K}$ exists depending on values of N and K, the number K of superposition UEs or the number N of used resources may be varied depending on Required SINR or target QoS of the communication system, whereby the MUI value may be controlled.

Figure 3:
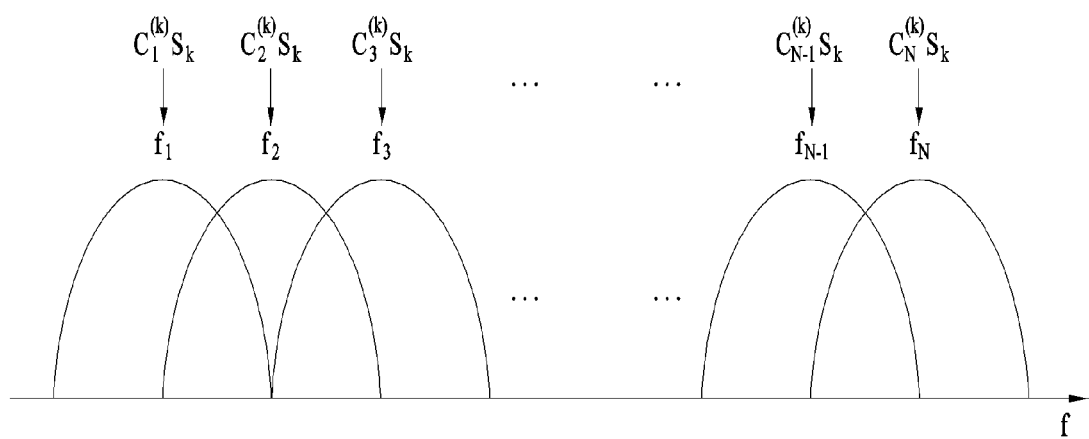
FIG. 3 is a conceptual diagram illustrating a frequency axis of data transmission based on UE-specific NCC.

FIG. 3 is a conceptual diagram illustrating a frequency axis of data transmission based on UE-specific NCC.

FIG. 3 illustrates a concept that a transmitting end transmits kth UE data on a frequency axis through UE-specific NCC. When UE-specific NCC defined by Grassmaniann line packing is previously scheduled by the transmitting end and the receiving end, data for the kth UE is multiplied by a codeword corresponding to the kth UE. At this time, one data symbol $s_k$ corresponds to a codeword vector $c^{(k)}$ of (N×1) dimension. Then, N elements of the codeword corresponds to N subcarriers.

That is, in FIG. 3, since one data symbol is transmitted on N subcarriers, the same time-frequency resource efficiency is reduced to 1/N as compared with the legacy LTE system. On the other hand, if N or more symbols are transmitted by superposition, time-frequency resource efficiency is increased as compared with the LTE system. For example, if K symbols are transmitted by superposition in case of N<K, frequency resource efficiency is increased as much as K/N times.

Figure 4:
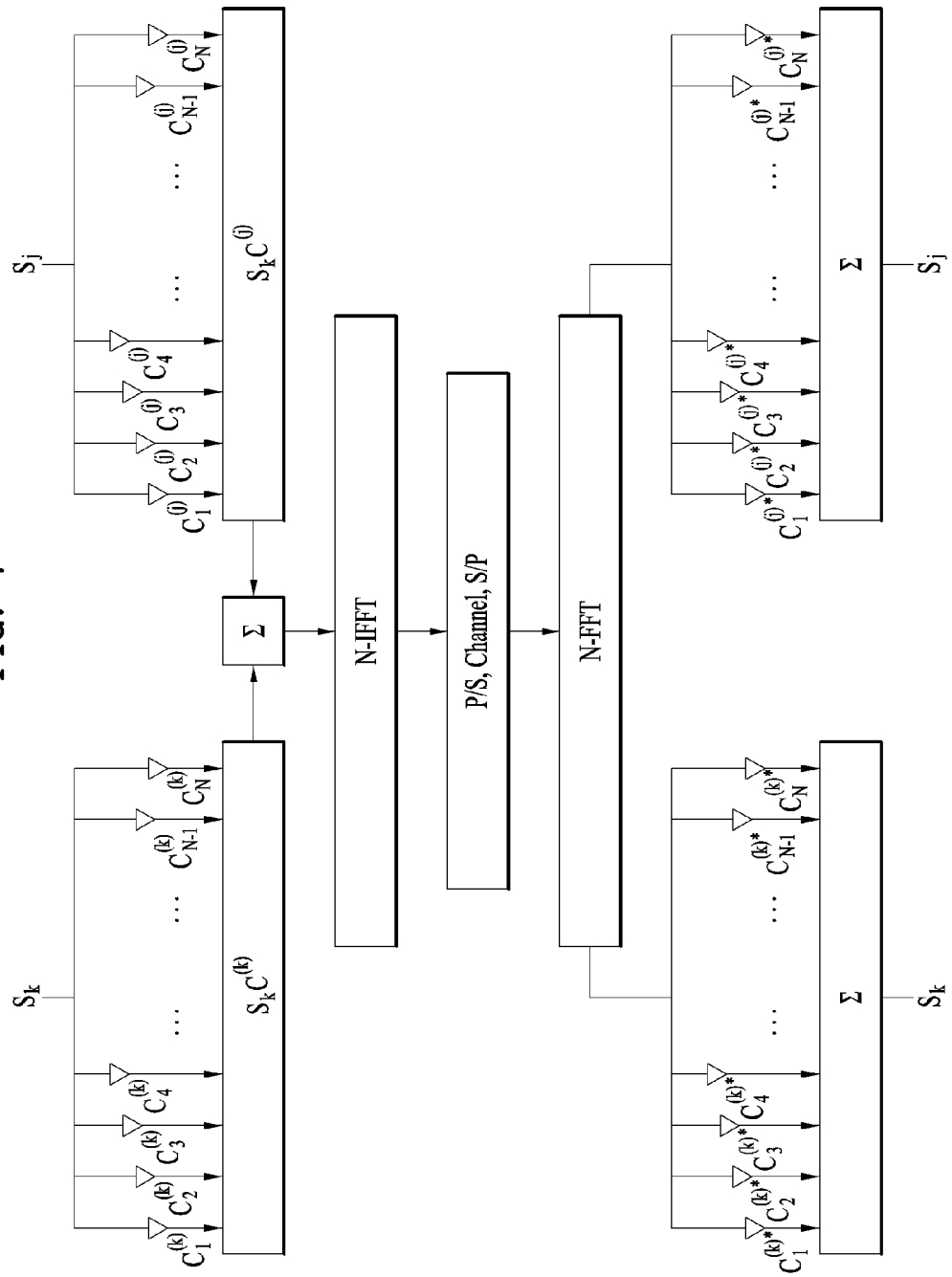
FIG. 4 is a structural diagram illustrating basic transmission and reception of an NCMA system.

FIG. 4 is a structural diagram illustrating basic transmission and reception of NCMA system.

FIG. 4 is a basic transmission and reception structural view of NCMA system that uses UE-specific NCC. Data symbols for each UE are converted to UE-specific NCC corresponding to each UE and superposed in the transmitting end. A frequency axis signal of a superposed N length is converted to a time-axis signal through N-IFFT, whereby OFDM transmission is performed, and the receiving end restores the time-axis signal to a frequency-axis signal through N-FFT. The restored frequency-axis signal decodes each UE data symbol using a conjugate codeword of UE-specific NCC corresponding to each UE. The decoded $s_k$ may include MUI depending on the number of superposed UEs, and exact $s_k$ decoding is available through MUD. At this time, the length of the frequency-axis signal converted in accordance with UE-specific NCC which is previously defined may be shorter than N. For example, if two frequency-axis signal vectors converted to UE-specific NCC of N/2 length are connected in series to form N length, it will be apparent that demodulation is available in the receiving end even in case of N-FFT.

Since the NCMA system allocates multi-UE data to the same resource, interference for multi-UE data occurs necessarily as compared with allocation of single-UE data. The received signal of the receiving end in the NCMA system of FIG. 2 is expressed as illustrated in the following Equation 3.

$$y = \sum_{n=1}^{K} H_n c^{(n)} s_n + n = H_k c^{(k)} s_k + \sum_{n \neq k, n=1}^{K} H_n c^{(n)} s_n + n,$$ [Equation 3]

In the above Equation 3, $H_k$ means (N×N) channel matrix from the kth transmitting end to the receiving end, and includes frequency-axis channel coefficients as a diagonal matrix. $c^{(k)}$ is (N×1) UE-specific NCC vector for the receiving end at the kth transmitting end, $s_k$ is a data symbol to the kth receiving end, and n means (N×1) signal noise vector. K is the number of multi-UEs allocated to the same time-frequency resource.

In the above Equation 3, the second item of the third formula indicates multi-UE interference signal MUI based on data symbol to another receiving end. A detection equation for data decoding of the kth UE in the receiving end is expressed as illustrated in the following Equation 4.

$$\hat{y}_k = \left[\frac{[y]_j}{[H_k]_{j,j}}\right]_{j=1,\ldots,N} = c^{(k)} s_k + \sum_{n=1}^{K} \left[\frac{[H_n]_{j,j}}{[H_k]_{j,j}}\right]_{j=1,\ldots,N} c^{(n)} s_n + \hat{n},$$ [Equation 4]

In this case, $$\left[\frac{[A]_j}{[B]_{j,j}}\right]_{j=1,\ldots,N}$$

means division of the jth element of vector A and the jth diagonal element of matrix B. If the vector A is a diagonal matrix, the vector A means element division of diagonal matrixes. A signal of desired codewords, MUI and noise remain through channel compensation for the kth UE data, and are detected as expressed by the following Equation 5 through conjugate codeword of UE-specific NCC of the receiving end.

[Equation 5]

$$\tilde{y}_k = c^{(k)*} \cdot \hat{y}_k = c^{(k)*} \cdot c^{(k)} s_k + \sum_{n \neq k, n=1}^{K} c^{(k)*} \cdot \left[\frac{[H_n]_{j,j}}{[H_k]_{j,j}}\right]_{j=1,\ldots,N} c^{(n)} s_n + \tilde{n},$$

$$= s_k + \sum_{n \neq k, n=1}^{K} c^{(k)*} \cdot \left[\frac{[H_n]_{j,j}}{[H_k]_{j,j}}\right]_{j=1,\ldots,N} c^{(n)} \cdot s_n + \tilde{n}.$$

In the Equation 5, the second item of the last column indicates MUI, and may be removed or reduced through the MUD scheme. At this time, frequency-axis channel change of $$\left[\frac{[H_n]_{j,j}}{[H_k]_{j,j}}\right]_{j=1,\ldots,N}$$

affects MUD performance based on UE-specific NCC due to a change of a channel environment from the multi-UE. That is, MUI value is changed by multi-UE channel environment, whereby the frequency-axis channel change affects interference cancellation performance when MUD is performed. Therefore, the present invention is intended to suggest a codeword selection apparatus for improving MUD performance by controlling MUI value of NCMA in an uplink and a feedback scheme. For convenience of description, a single transmitting and receiving antennas is provided, it will be apparent that the same scheme is applied to even an environment where multiple antennas are used.

In detail, the present invention is intended to suggest an apparatus for selecting a non-orthogonal spread codeword to control multi-UE interference of a non-orthogonal coded multiple access system that transmits multi-UE data through superposition to the same time-frequency resource in an uplink and a feedback scheme.

Non-Orthogonal Coded Multiple Access (NCMA)

An apparatus for selecting UE-specific NCC to control multiuser interference by means of multiuser channel environment in an uplink NCMA system and a feedback scheme will be required.

MUI of the receiving end for data decoding of the kth UE is expressed as illustrated in the following Equation 6.

$$\sum_{n \neq k, n=1}^{K} \left| c^{(k)*} \cdot \left[\frac{[H_n]_{j,j}}{[H_k]_{j,j}}\right]_{j=1,\ldots,N} c^{(n)} \right|^2 \quad [\text{Equation 6}]$$

MUI value is varied depending on channel compensation of a channel environment of a multi-UE as expressed in the above Equation 6, and a codeword selection scheme may be defined in accordance with the MUD scheme as expressed by the following Equation 7.

$$SIC: i = \arg\min_{c^{(k)}} \Sigma_{n=k+1}^{K} \left| c^{(k)*} \cdot \left[\frac{[H_n]_{j,j}}{[H_k]_{j,j}}\right]_{j=1,\ldots,N} c^{(n)} \right|^2, \quad [\text{Equation 7}]$$

$$\forall k, k = 1, \ldots, K-1$$

A sequential detection scheme such as Successive Interference Cancellation (SIC) cancels first data from received signals for detection of next data after detecting the first data when the receiving end performs MUD. In this case, detection accuracy of the first data affects detection accuracy of next data. Therefore, a multi-UE interference level is hierarchized through ordering of UE data in the same manner as the above criterion. In this case, ordering of UE data may be determined in view of fairness or total throughput in accordance with a system environment. That is, it is assumed that ordering is determined and given in accordance with a scheduling scheme of a system which is used. For example, when the first user is selected through ordering of a user, the user selects a non-orthogonal spread code i, which makes the least multiuser interference from the second user to the Kth user, through the criterion. Likewise, as a codeword for the second user, a codeword, which makes the least multiuser interference from the third user to the Kth user, is selected. In this case, when a codeword for one user is selected, since a codeword for another user has not been determined, the codeword for another user may be selected randomly, and a set of total codewords may be calculated in a manner of full-search.

The following Equation 8 shows a Parallel Interference Cancellation (PIC) scheme as an example of the codeword selection scheme in accordance with the MUD scheme.

$$PIC \text{ (or } ML\text{): } I = \quad [\text{Equation 8}]$$

$$\arg\min_{c^{(1)},\ldots,c^{(K)}} \left\{ \max\left( \Sigma_{n \neq k, n=1}^{K} \left| c^{(k)*} \cdot \left[\frac{[H_n]_{j,j}}{[H_k]_{j,j}}\right]_{j=1,\ldots,N} c^{(n)} \right|^2 \right) \right\}, \forall k, k = 1, \ldots, K$$

In case of parallel or full-search detection such as Parallel Interference Cancellation (PIC) or Maximum Likelihood (ML) scheme during MUD of the receiving end, data detection of all UEs affects detection accuracy of full data. Therefore, in the same manner as the above criterion, allocation of a non-orthogonal spread codeword set in which a maximum value of full multiuser interference becomes a minimum value is required. An optimal codeword set in which a maximum value of multiuser interference becomes a minimum value may be calculated based on the above criterion, whereby MUD performance of total users may be enhanced.

The codeword selection scheme and the MUD scheme may be selected dynamically in accordance with a system environment. For example, SIC performance may be more improved by a channel effect value $$\left[\frac{[H_n]_{j,j}}{[H_k]_{j,j}}\right]_{j=1,\ldots,N}$$

of MUI, which is obtained during channel equalization, due to a difference in channel gain between UEs or a difference in channel variation based on frequency spreading, if there is a big difference in MUI value per UE. Alternatively, SIC performance may be better than PIC performance in view of same complexity. Also, if it is difficult to assume close loop power control (or transmission power control) with respect uplink transmission (for example, if it is intended to achieve energy efficiency and low latency by minimizing control signaling before data transmission such as mMTC/URLLC), SIC may be efficient if there is a difference in symbol power between multiusers in the base station which is a receiving end. Therefore, in this case, SIC based codeword allocation scheme and SIC based MUD are efficient. On the other hand, in an opposite case of the above case, since SIC performance may not be ensured and error propagation may occur, PIC or ML based codeword allocation scheme and MUD may be efficient. Therefore, the codeword allocation scheme and MUD scheme are selected in accordance with properties of the system environment.

In selection of the aforementioned codeword allocation scheme and MUD scheme, if the system environment is varied in the same system, and if SIC based and PIC based or ML based codeword allocation scheme and MUD scheme are all supported, a transceiving device of the base station may be operated in mode selection. For example, the operation of mode selection of the base station means an operation as to whether the base station selects SIC based codeword scheme, or PIC or ML based codeword allocation scheme. At this time, signals for codeword index may be transmitted through two fields in a downlink control information (DCI) format, wherein one of the two fields may designate an available or selected codeword index and the other field may indicate a codeword allocation scheme according to MUD scheme, which is based on PIC, ML or SIC.

SIC based codebook and PIC based codebook may be different from each other with respect to selection of SIC based codeword and selection of PIC based codeword in the aforementioned method. In this case, with respect to mode selection, the base station may select allocation (or selection) of SIC based non-orthogonal codeword within SIC based codebook when performing scheduling. Also, the base station may select allocation (or selection) of PIC based non-orthogonal codeword within PIC based codebook when performing scheduling.

Figure 5:
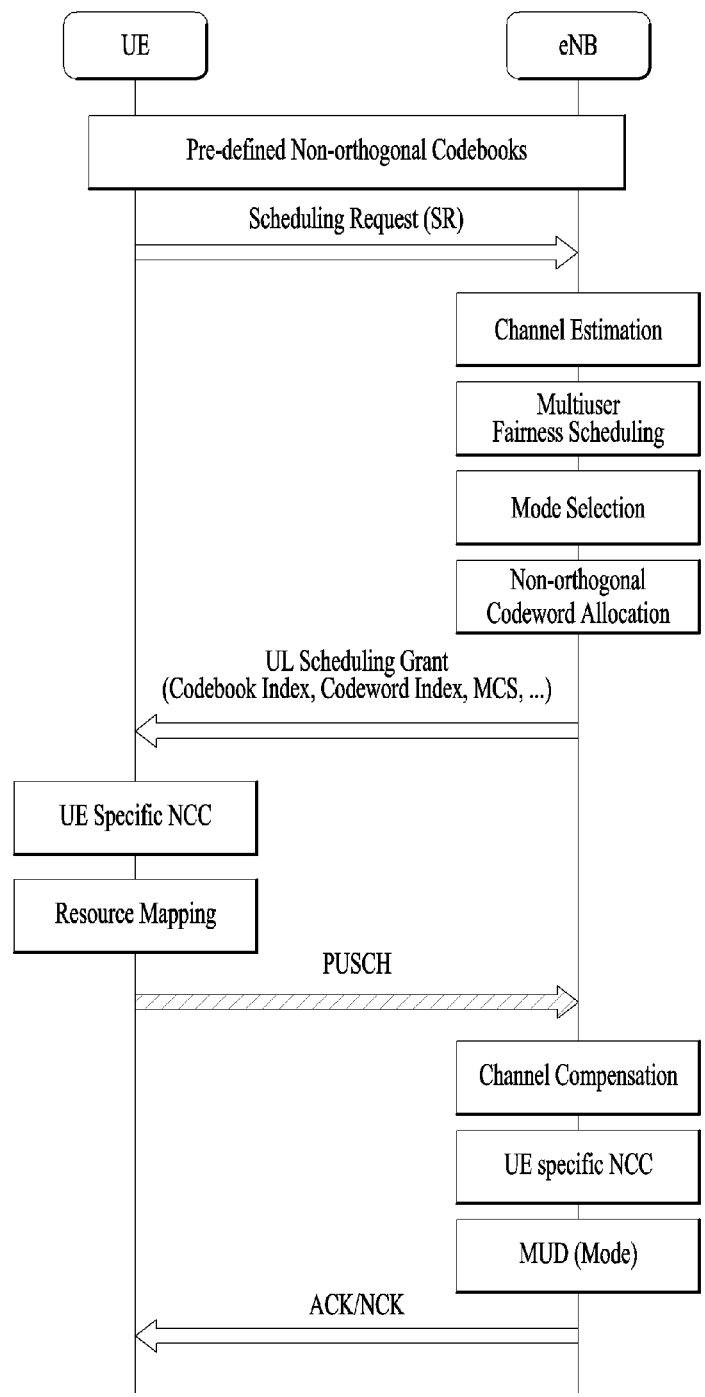
FIG. 5 is a signal flow chart for MUI control according to a channel environment of an uplink NCMA system.

FIG. 5 is a signal flow chart for MUI control according to a channel environment of an uplink NCMA system.

A non-orthogonal spreading codeword selection apparatus and an information exchange scheme will be described in detail with reference to FIG. 5. A UE and a base station (eNB) may share predefined non-orthogonal codebooks. The UE may transmit a scheduling request (SR) to the base station to request the base station of uplink control information. The base station may perform channel estimation through the received SR, and may perform multiuser scheduling (for example, scheduling according to fairness scheduling scheme for performing scheduling in view of multiuser fairness).

The base station performs mode selection for selecting MUD scheme based on the estimated channel information and multiuser scheduling (S530). The base station may select a codebook (for example, codebook index) for the corresponding UE from predefined non-orthogonal codebooks and select a codeword (for example, codeword index) from the selected codebook by means of criterion suggested in accordance with the selected MUD scheme. The codebook index and the codeword index are selected UE-specifically.

Additionally, after the base station selects the codeword index for the corresponding UE, the base station may perform statistical prediction of MUI by means of the number of UEs as described above. If the number of UEs is determined, since a decoding error rate of the receiving side may be predicted by MUI value, the base station may select MCS (Modulation and Coding Scheme) level, which will be used, based on interference for multiuser superposition transmission.

The base station may transmit information (for example, codebook index) on the selected codebook and information (for example, codeword index) on the selected codeword to the corresponding UE through a downlink control channel (for example, uplink scheduling grant, UL grant, etc.). At this time, the base station may transmit the information to the corresponding UE by further including the selected MCS level in the uplink scheduling grant.

As described above, signaling for codeword index may be performed in such a manner that the base station transmits a downlink control channel (for example, two fields through DCI (Downlink Control Information)) to the corresponding UE, wherein one field includes information indicating available or the selected codeword index and the other one field includes information indicating the codeword allocation scheme according to the selected MUD scheme.

Afterwards, the UE may perform resource mapping for data transmission, that is, resource mapping for the data, which will be transmitted, on the basis of the allocated codebook index and codeword index or the codebook index and codeword index selected for the UE. After resource mapping for the data to be transmitted, the corresponding UE may transmit data (for example, PUSCH) to the base station.

The base station detects the data transmitted from the corresponding UE by performing MUD, which is selected based on the codebook index and codeword index (UE-specific NCC) allocated to the corresponding UE or the codebook index and codeword index selected for the corresponding UE, for the data received from the corresponding UE.

The base station performs channel estimation or channel compensation after receiving the data from the corresponding UE, wherein channel estimation or channel compensation may be varied depending on the system, and the criterion equation may be varied depending on each channel estimation or channel compensation. In FIG. 5, the codeword selection apparatus that may control multi-UE MUI value variation according to frequency axis variation of a multi-UE channel has been suggested and the selection codeword exchange scheme has been described.

Although the present invention has been described based on an uplink of a cellular system, the present invention is applicable to all systems which use Machine Type Communication (MTC), Device-to-Device (D2D) and Vehicle-to-Everything (V2X).

Through one embodiment of the present invention, variation of multi-UE interference according to multi-UE channel variation of the NCMA system may be avoided and uniform interference may be maintained, whereby MUD performance of the receiving side may be enhanced.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The method for transmitting and receiving a signal based on a non-orthogonal multiple access system and an apparatus therefor are industrially applicable to various wireless communication systems such as 3GPP LTE-A and 5G system.

The invention claimed is:

1. A method for a user equipment (UE) in a wireless communication system, the method comprising:
receiving, from a base station, control information including information on a codebook corresponding to a multi-user detection (MUD) scheme, selected for the UE from predefined non-orthogonal codebooks and information on a codeword selected from the selected codebook, wherein the MUD scheme is selected from among a successive interference cancellation (SIC) scheme and a parallel interference cancellation (PIC) scheme, and the SIC scheme relates to a first MUD scheme to detect sequentially and the PIC scheme relates to a second MUD scheme to minimize a maximum value of full multi-user interferences, and the selected codebook is determined based on satisfying the selected MUD scheme;
performing resource mapping for uplink data to be transmitted based on the information on the selected codebook and the information on the codeword selected from the selected codebook; and
transmitting, to the base station, the uplink data mapped into a corresponding resource according to the resource mapping.

2. The method according to claim 1, wherein the information on the selected codebook includes a selected codebook index.

3. The method according to claim 1, wherein the information on the selected codeword includes selected codeword index information.

4. The method according to claim 3, wherein the information on the selected codeword further includes information indicating a codeword assignment scheme according to the selected MUD scheme.

5. The method according to claim 1, wherein the information on the selected codebook and the information on the codeword selected from the selected codebook are selected UE-specifically.

6. A method for a base station (BS) in a wireless communication system, the method comprising:
selecting a multi-user detection (MUD) scheme from among a successive interference cancellation (SIC) scheme and a parallel interference cancellation (PIC) scheme, wherein the SIC scheme relates to a first MUD scheme to detect sequentially and the PIC scheme relates to a second MUD scheme to minimize a maximum value of full multi-user interferences, and the selected codebook is determined based on satisfying the selected MUD scheme;
selecting a codebook corresponding to the selected MUD scheme for the UE from predefined non-orthogonal codebooks and a codeword from the selected codebook based on the selected MUD scheme; and
transmitting, to the UE, control information including information on the selected codebook and information on the selected codeword.

7. The method according to claim 6, further comprising:
receiving uplink data according to scheduling of the control information from the UE; and
detecting the uplink data of the UE based on the information on the selected codebook, the information on the selected codeword and the selected MUD scheme.

8. The method according to claim 6, wherein the MUD scheme is selected based on a result of channel estimation for the UE and a scheduling scheme.

9. The method according to claim 8, further comprising:
performing channel estimation for the UE; and
performing scheduling for multi-UE in accordance with the scheduling scheme.

10. A user equipment (UE), comprising:
a receiver configured to receive, from a base station (BS), control information including information on a codebook corresponding to a multi-user detection (MUD) scheme, selected for the UE from predefined non-orthogonal codebooks and information on a codeword selected from the selected codebook, wherein the MUD scheme is selected from among a successive interference cancellation (SIC) scheme and a parallel interference cancellation (PIC) scheme, and the SIC scheme relates to a first MUD scheme to detect sequentially and the PIC scheme relates to a second MUD scheme to minimize a maximum value of full multi-user interferences, and the selected codebook is determined based on satisfying the selected MUD scheme;
a processor configured to perform resource mapping for uplink data to be transmitted based on the information on the selected codebook and the information on the codeword selected from the selected codebook; and a transmitter configured to transmit, to a base station (BS), the uplink data mapped into a corresponding resource according to the resource mapping.

11. The UE according to claim 10, wherein the information on the selected codebook and the information on the codeword selected from the selected codebook are selected UE-specifically.

12. A base station (BS), comprising:
a processor configured to:
select a multi-user detection (MUD) scheme from among a successive interference cancellation (SIC) scheme and a parallel interference cancellation (PIC) scheme, wherein the SIC scheme relates to a first MUD scheme to detect sequentially and the PIC scheme relates to a second MUD scheme to minimize a maximum value of full multi-user interferences, and the selected codebook is determined based on satisfying the selected MUD scheme; and
select a codebook corresponding to the selected MUD scheme for the UE from predefined non-orthogonal codebooks and a codeword from the selected codebook based on the selected MUD scheme; and
a transmitter configured to transmit, to the UE, control information including information on the selected codebook and information on the selected codeword.

13. The BS according to claim 12, further comprising:
a receiver configured to receive uplink data according to scheduling of the control information from the UE,
wherein the processor is configured to detect the uplink data of the UE based on the information on the selected codebook, the information on the selected codeword and the selected MUD scheme.

14. The BS according to claim 12, wherein the processor is configured to select the MUD scheme based on a result of channel estimation for the UE and a scheduling scheme.

15. The BS according to claim 14, wherein the processor is configured to perform channel estimation for the UE and perform scheduling for multi-UE in accordance with the scheduling scheme.

* * * * *